US008457891B1

(12) United States Patent
Vallot et al.

(10) Patent No.: US 8,457,891 B1
(45) Date of Patent: Jun. 4, 2013

(54) SYSTEMS AND METHODS FOR COMPENSATING NONLINEARITIES IN A NAVIGATIONAL MODEL

(75) Inventors: Lawrence Charles Vallot, Lake Elmo, MN (US); Timothy Merrill Buck, Oakdale, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/527,136

(22) Filed: Jun. 19, 2012

(51) Int. Cl.
*G01C 21/10* (2006.01)
(52) U.S. Cl.
USPC .......................................................... 701/501
(58) Field of Classification Search
USPC .......................................................... 701/501
See application file for complete search history.

(56) References Cited

U.S. PATENT DOCUMENTS

| | | | |
|---|---|---|---|
| 6,853,947 | B1 | 2/2005 | Horton |
| 7,193,559 | B2 | 3/2007 | Ford |
| 7,490,008 | B2 | 2/2009 | Draganov |
| 7,868,821 | B2 | 1/2011 | Hoshizaki |
| 8,275,544 | B1 * | 9/2012 | Wells et al. ............. 701/501 |
| 2004/0188561 | A1 * | 9/2004 | Ratkovic et al. .......... 244/3.15 |

OTHER PUBLICATIONS

Smith, "Use of the Global Positioning System (GPS) on an Attack Aircraft to Improve Altitude Accuracy During Weapons Delivery", Feb. 1995, pp. 1-96.
Julier et al., "A New Extension of the Kalman Filter to Nonlinear Systems", Apr. 1997, pp. 1-12.

* cited by examiner

*Primary Examiner* — James Trammell
*Assistant Examiner* — Michael D Lang
(74) *Attorney, Agent, or Firm* — Fogg & Powers LLC (57) ABSTRACT

Systems and methods are provided for compensating nonlinearities in a navigational model. In one embodiment, a system comprises an inertial measurement unit configured to measure inertial motion of a vehicle and an aiding source configured to provide observational measurements of vehicle motion. Further, the system comprises a navigation computer coupled to the inertial measurement unit and the aiding source, wherein the navigation computer is configured to calculate a predicted state and an error covariance data based on the measured inertial motion received from the inertial measurement unit and the observational measurements from the aiding source and calculate variance increments based on attitude uncertainty in the predicted state. Also, the navigation computer is configured to add the variance increments into a process noise covariance matrix for the predicted state and calculate an update for the vehicle motion based on the predicted state, the error covariance data, and the observational measurements.

20 Claims, 3 Drawing Sheets

SYSTEMS AND METHODS FOR COMPENSATING NONLINEARITIES IN A NAVIGATIONAL MODEL

BACKGROUND

In navigation systems having multiple navigation sensors, a navigation computer frequently blends measurements from the multiple navigation sensors using a Kalman filter. A Kalman filter is an algorithm that implements a linear model to represent the movement of the navigating object. Generally, despite unmodeled nonlinearities in the object's motion, the Kalman filter linear models sufficiently represent the motion of the object because the unmodeled nonlinearities are small in magnitude. However, sometimes the unmodeled nonlinearities can negatively impact the accuracy of navigation solutions calculated using Kalman filters.

SUMMARY

The embodiments of the present disclosure provide systems and methods for compensating nonlinearities in a navigational model and will be understood by reading and studying the following specification.

Systems and methods are provided for compensating nonlinearities in a navigational model. In one embodiment, a system comprises an inertial measurement unit configured to measure inertial motion of a vehicle and an aiding source configured to provide observational measurements of motion for the vehicle. Further, the system comprises a navigation computer coupled to the inertial measurement unit and the aiding source, wherein the navigation computer is configured to calculate a predicted state and an error covariance data based on the measured inertial motion received from the inertial measurement unit and the observational measurements from the aiding source and calculate variance increments based on attitude uncertainty in the predicted state. Also, the navigation computer is configured to add the variance increments into a process noise covariance matrix for the predicted state and calculate an update for the motion of the vehicle based on the predicted state, the error covariance data, and the observational measurements.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustrating specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
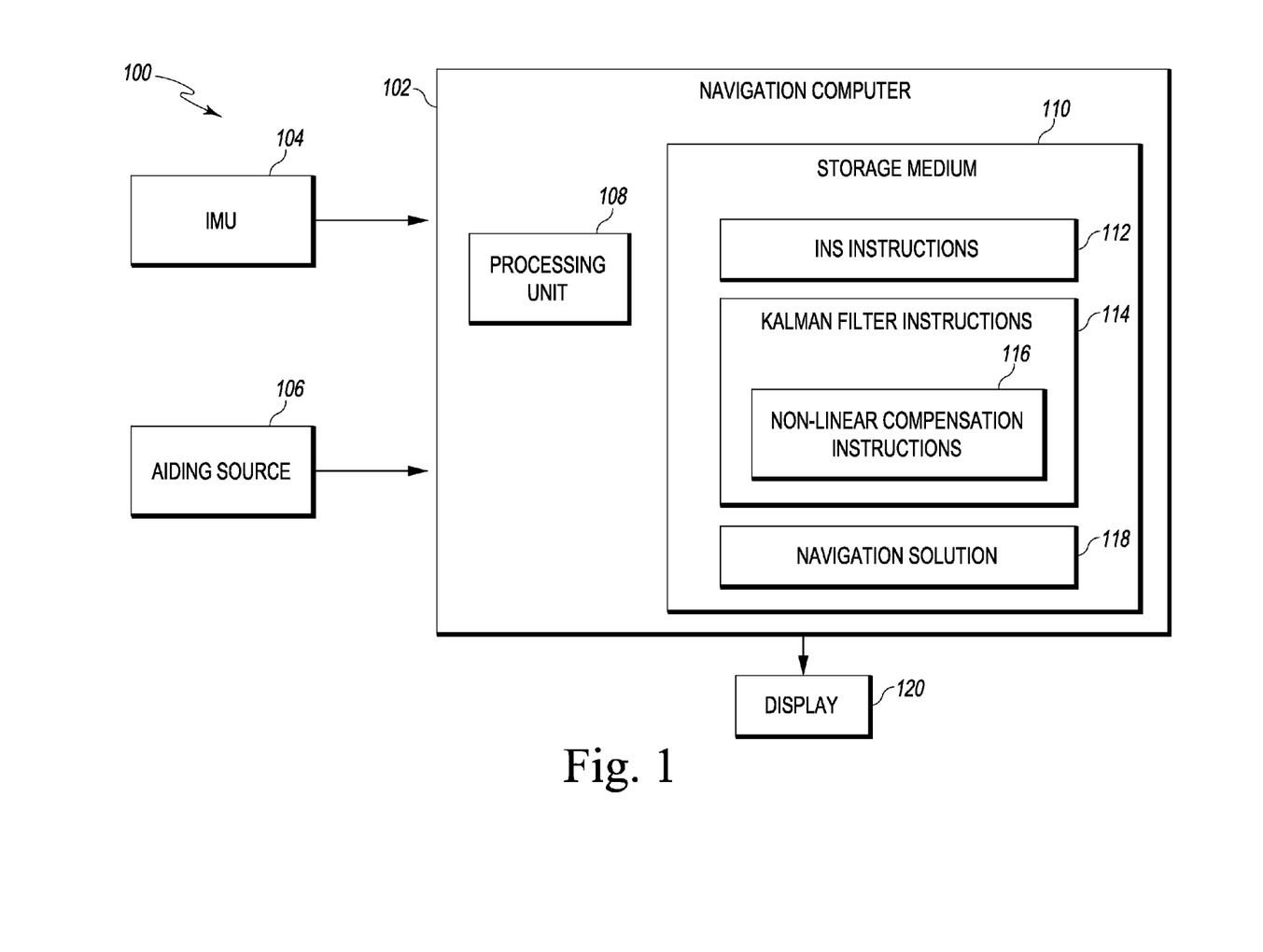
FIG. 1 is a block diagram of a navigational system that compensates for nonlinearities introduced into a navigational model according to one embodiment.

FIG. 1 is a block diagram of a navigation system 100 for calculating a navigation solution 118 for a vehicle, where navigation solution 118 describes the position, attitude, heading, and velocity of the vehicle. In certain embodiments, navigation system 100 includes an inertial measurement unit (IMU) 104. IMU 104 is a sensor device configured to sense motion and to output data that corresponds to the sensed motion. In one embodiment, IMU 104 comprises sets of gyroscopes and accelerometers that determine information about motion in any of six degrees of freedom (that is, lateral motion in three perpendicular axes and rotation about three perpendicular axes).

The navigation system 100 further includes a navigation computer 102 that receives measurements from IMU 104 and uses the measurements to predict a navigation solution 118 for the vehicle. The navigation computer 102 includes one or more processing units 108 that process executable instructions and data received from external sensors to determine the navigation solution 118. In at least one embodiment, navigation computer 102 includes a storage medium 110 for storing instructions processed by processing unit 108 and data created during the processing of navigation data. Storage medium 110 comprises, in one implementation, a tangible non-transitory medium for storing machine readable data. Further, in at least one exemplary implementation, the navigation computer 102 provides navigation solution 118 to a display 120 to indicate the current navigation solution 118 to a user who is navigating a vehicle. For example, display 120 includes a touchscreen, a monitor, and the like.

In an example, the processing unit 108 can include a central processing unit (CPU), microcontroller, microprocessor (e.g., a digital signal processor (DSP)), field programmable gate array (FPGA), application specific integrated circuit (ASIC), or other processing device. The storage medium 110 can include any appropriate processor readable medium used for storage of processor readable instructions or data structures. Suitable processor readable media can include tangible media such as magnetic or optical media. For example, tangible media can include a conventional hard disk, compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc. Suitable processor-readable media can also include transmission media such as electrical, electromagnetic, and digital signals, conveyed via a communication medium such as a network and/or a wireless link. Moreover, it should be understood that the processor readable media can be integrated into the navigation computer 102 as in, for example, RAM, or can be a separate item to which access can be provided to the navigation computer 102 as in, for example, portable media such as a compact disk or flash drive.

In certain embodiments, storage medium 110 includes inertial navigation system (INS) instructions 112. INS instructions 112 direct processing unit 108 to predict states that describe the vehicle motion, where the states are used to calculate the navigation solution 118, from the measurements received from IMU 104. For example, INS instructions 112 direct processing unit 108 to use dead reckoning to calculate navigation solution 118 from motion information received from IMU 104. However, because the navigation solution 118 is calculated using dead reckoning, over time errors in the calculation of navigation solution 118 accumulate, causing the accuracy of the predicted states to drift away from the true state of the vehicle motion.

To correct the accumulation of errors that are inherent in dead reckoning calculations, the navigation system also includes an aiding source 106. Aiding source 106 is a sensor that acquires information about the position, attitude, velocity, and/or heading to bound the accumulating errors that result from calculating the navigation solution 118 using motion information from IMU 104. For example, aiding source 106 can be a GPS receiver, a vision sensor, or the like. To correct the accumulating errors from the IMU 104 using measurements from aiding source 106, storage medium 110 includes Kalman filter instructions 114. Kalman filter instructions 114 direct processing unit 108 to use a linear model to use measurements from aiding source 106 to update the navigation solution calculated based on the measurements from IMU 104. In certain embodiments, Kalman filter instructions use motion information from IMU 104 to calculate a predicted navigation solution. However, as was stated above, navigation solutions calculated from measurements from IMU 104 slowly drift away from the true navigation solution for a vehicle. In contrast, aiding source 106 provides position estimates that are accurate to within a certain range but are noisy within that range. In one exemplary embodiment, aiding source 106 is a GPS receiver. The GPS receiver provides noisy measurements that are accurate to within a few meters. Kalman filter instructions 114 direct processing unit 108 to blend the drifting measurements from IMU 102 and the noisy measurements from aiding source 106 to update and increase the accuracy of navigation solution 118.

As was stated, the Kalman filter implemented by the execution of Kalman filter instructions 114 implements a linear model that describes the motion of the vehicle, however the motion of the vehicle is not always linear. The nonlinearities that arise during operation of the navigation computer 102 can introduce errors into the navigation solution 118 calculated using the implemented Kalman filter. Frequently, the errors that arise due to nonlinearities fail to have a significant effect on the accuracy of navigation solution 118. However, there are certain unmodeled nonlinearities that cause significant errors under certain trajectory conditions. For example, when the attitude error in a predicted state is large, high frequency motion, large accelerations, and extended periods of ballistic (or near ballistic) flight cause significant errors in the navigation solution 118 to develop due to unmodeled nonlinearities. To compensate for the unmodeled nonlinearities, Kalman filter instructions 114 include non-linear compensation instructions 116. Non-linear compensation instructions 116 direct processing unit 108 to increment the process noise in the linear model based on the uncertainty in the states predicted by the execution of Kalman filter instructions 114. The term "increment," as used herein, refers to a change in value, where the change can be either positive or negative, depending on the uncertainty in the navigation solution. The increments to the process noise indicate the reliability of the predicted states. The processing unit 108 uses the process noise covariance matrix when updating the predicted states with measurements from the aiding source 106. For example, when the process noise for a particular component of the predicted states is large, the processing unit 108 will rely more heavily on the measurements from the aiding source 106 when calculating the corresponding component of the updated states.

Figure 2:
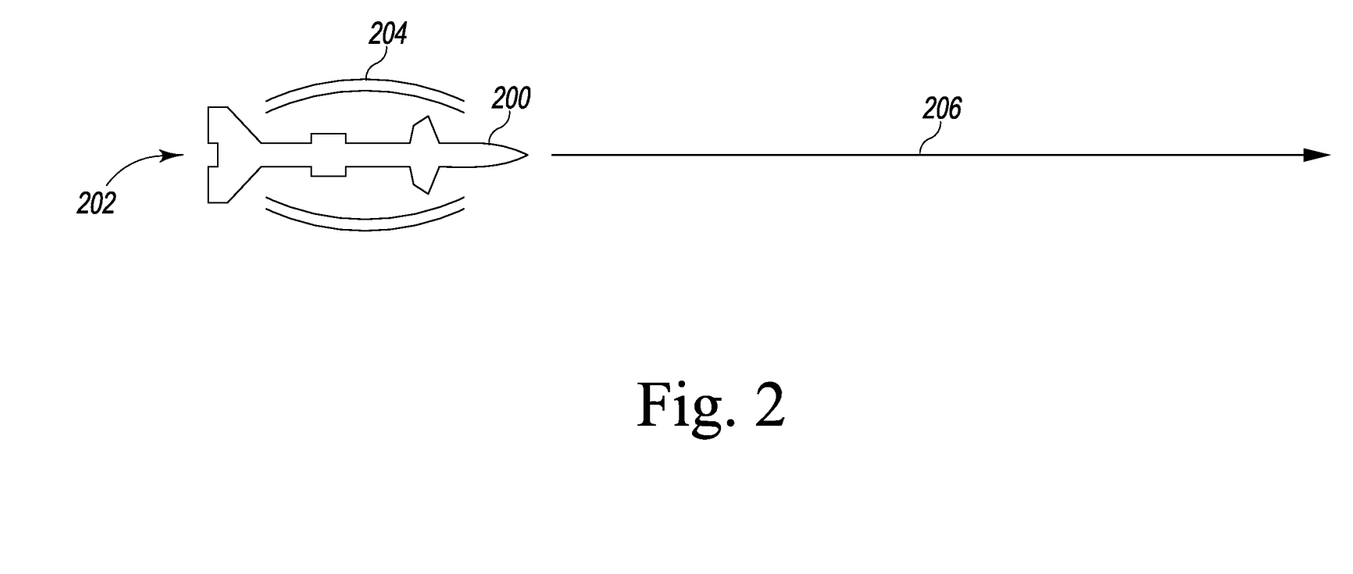
FIG. 2 is a diagram of an aerial vehicle that experiences motion that introduces nonlinearities into a navigational model according to one embodiment.

FIG. 2 is a diagram of an aerial vehicle 200 that experiences motion that can introduce significant errors into a linear model due to unmodeled nonlinearities caused by attitude error. As described above, aerial vehicle 200 experiences certain motion that can cause the linear model for the navigation solution to develop significant errors due to unmodeled nonlinearities. In certain situations, the unmodeled nonlinearities include large accelerations 202 combined with an attitude error, high frequency motion 204 combined with an attitude error, and ballistic flight 206 combined with an attitude error. The non-linear compensation instructions 116 in FIG. 1 direct processing unit 108 to compensate for the unmodeled nonlinearities caused by the aforementioned trajectories by incrementing the process noise associated with the predicted states of the vehicle motion.

When large accelerations 202 cause errors in the navigation solution 118 to develop due to unmodeled nonlinearities, the unmodeled nonlinearities are associated with a term in the inertial navigation error model that involves the cross product of attitude error and non-gravitational acceleration. The unmodeled nonlinearities arise because the processing unit 108, executing Kalman filter instructions 114, does not directly use local level frame acceleration measurements received from IMU 102, but rather calculates local level acceleration by transforming the body frame specific force, as measured by the accelerometers, to the local level frame through a transformation matrix. The transformation of the body frame specific force into a local level frame acceleration introduces nonlinearities because the computation of the local level frame specific force is a function of attitude error and the representation of the attitude error is only accurate for small angle error conditions.

The computed local level frame specific force being a function of attitude error is illustrated by the following equations. First, the velocity derivative error is represented by the equation:

$$\frac{d(\delta v)}{dt} = -\Psi \times A_L + \dots ,$$

where $\Psi$ is the attitude error relative to the earth and $A_L$ is the local level frame specific force. As was mentioned above, the Kalman filter instructions 114 direct processing unit 108 to use the local level frame specific force $A_L$ when calculating acceleration. Further, the local level frame specific force $A_L$ is calculated based on the following equation:

$$A_L = C_b^L(nav) * A_b$$

where $C_b^L(nav)$ is the body to local level transformation matrix that is calculated using the navigation solution and $A_b$ is the specific force in the body axes. Inserting the definition of $A_L$ into the equation for the velocity derivative error equation yields:

$$\frac{d(\delta v)}{dt} = -\Psi \times C_b^L(nav) * A_b$$

Further, $$C_b^L(nav) = C_b^L(true) + \delta C_b^L,$$

where $C_b^L$(true) is the true body to local level transformation matrix and $\delta C_b^L$ is the error in the local level transformation matrix. $\delta C_b^L$ can further be defined by the equation:

$$\delta C_b^L = \{-\Psi\} * C_b^L(\text{true}),$$

where $\{\Psi\}$ is a skew symmetric matrix of the attitude error $\Psi$ associated with the local level transformation matrix. Placing the definition of $C_b^L$(nav) and $\delta C_b^L$ into the equation for the velocity derivative error equation yields:

$$\frac{d(\delta v)}{dt} = -\Psi \times (I - \{\Psi\}) * C_b^L(\text{true}) * A_b.$$

As shown in the above equation, $A_L$ is a function of $\{\Psi\}$. Thus, the velocity derivative error equation can further be rewritten as:

$$\frac{d(\delta v)}{dt} = -\Psi \times A_L(\Psi).$$

Because $A_L$ is a function of $\{\Psi\}$, the velocity derivative error is a nonlinear equation with respect to the attitude error of the vehicle.

Further, the linear model assumes that the angle errors between the transformation matrices $C_b^L$(true) and $C_b^L$(nav) are sufficiently small such that the angle errors are negligible. As can be seen from the above equations, $C_b^L(\text{nav}) = (I - \{\Psi\}) * C_b^L(\text{true})$. When the transformation matrices transform the body specific force to the local level frame in three dimensions, $C_b^L$(nav), $C_b^L$(true), I, and $\{\Psi\}$ are 3×3 matrices. Further, $\{\Psi\}$ is a skew symmetric matrix that can be represented by the following:

$$\{\Psi\} = \begin{bmatrix} 0 & -\Psi_3 & \Psi_2 \\ \Psi_3 & 0 & -\Psi_1 \\ -\Psi_2 & \Psi_1 & 0 \end{bmatrix},$$

where $\Psi_1$, $\Psi_2$, and $\Psi_3$ are components of the attitude error vector $\Psi$. As $\{\Psi\}$ is skew symmetric, the equation assumes that differences between the diagonal elements in the transformation matrices will be negligible as exemplified by the following where:

$$C_b^L(\text{true}) = \begin{bmatrix} C_{11}(\text{true}) & C_{12}(\text{true}) & C_{13}(\text{true}) \\ C_{21}(\text{true}) & C_{22}(\text{true}) & C_{23}(\text{true}) \\ C_{31}(\text{true}) & C_{32}(\text{true}) & C_{33}(\text{true}) \end{bmatrix}$$

and $$C_b^L(\text{nav}) = \begin{bmatrix} C_{11}(\text{nav}) & C_{12}(\text{nav}) & C_{13}(\text{nav}) \\ C_{21}(\text{nav}) & C_{22}(\text{nav}) & C_{23}(\text{nav}) \\ C_{31}(\text{nav}) & C_{32}(\text{nav}) & C_{33}(\text{nav}) \end{bmatrix};$$

such that $C_{11}(\text{true}) \approx C_{11}(\text{nav})$, $C_{22}(\text{true}) \approx C_{22}(\text{nav})$, and $C_{33}(\text{true}) \approx C_{33}(\text{nav})$. However, when the angle errors are substantially large enough between $C_b^L$(true) and $C_b^L$(nav), the diagonal elements become unequal, such that $C_{11}(\text{true}) \neq C_{11}(\text{nav})$, $C_{22}(\text{true}) \neq C_{22}(\text{nav})$, or $C_{33}(\text{true}) \neq C_{33}(\text{nav})$ and the model equation for describing the relationship between transformation matrices $C_b^L$(true) and $C_b^L$(nav) becomes unable to compensate for the angle errors between $C_b^L$(true) and $C_b^L$(nav).

To compensate for the errors that arise due to the unmodeled nonlinearities that arise during large accelerations, non-linear compensation instructions 116 direct processing unit 108 to define velocity and position variance increments as a function of attitude uncertainty and the integrated local level specific force. When the Kalman filter instructions 114 direct processing unit 108 to calculate a predicted state based on motion information from IMU 104, the processing unit 108 calculates a predicted state estimate and a predicted state covariance for the motion of the vehicle, where the calculation of the predicted state estimate includes the calculation of a predicted velocity and position. In one embodiment, the processing unit 108 calculates the predicted state estimate $\hat{x}_{k+1}$ for the vehicle motion according to the equation $\hat{x}_{k+1} = \Phi \hat{x}_k$, where $\hat{x}_k$ is a previously predicted state estimate and $\Phi$ is a state transition model that is applied to the previously predicted state estimate $\hat{x}_k$. Also, the processing unit 108 calculates a predicted estimate covariance matrix $P_{k+1}$ for the predicted state estimate $\hat{x}_{k+1}$ according to the equation $P_{k+1} = \Phi P_k \Phi^T + Q_k$, where $Q_k$ is the process noise covariance matrix. To compensate for the unmodeled nonlinearities due to large accelerations, the processing unit 108 increments the components in the process noise covariance matrix $Q_k$ that correspond to the velocity and position estimates.

The process noise covariance matrix $Q_k$ includes variances for the velocity and position for the different directions along coordinate axes. For example, process noise covariance matrix $Q_k$ includes values that correspond to the variances for velocity (denoted as $v_x$, $v_y$, and $v_z$) and position (denoted as $p_x$, $p_y$, and $p_z$) where the variances are denoted as $\sigma_{v_x}^2$, $\sigma_{v_y}^2$, $\sigma_{v_z}^2$, $\sigma_{p_x}^2$, $\sigma_{p_y}^2$, and $\sigma_{p_z}^2$ that are computed using the values in the estimated covariance matrix $P_k$ that correspond to the attitude errors $\Psi$ along the different directions in the coordinate axes denoted as $P_{\Psi_x\Psi_x}$, $P_{\Psi_y\Psi_y}$, and $P_{\Psi_z\Psi_z}$.

To increment the process noise covariance matrix $Q_k$, the processing unit 108 calculates the variance increments for the velocity estimates using the following equations:

$$\sigma_{v_x}^2 = \left(w(P_{\Psi_y\Psi_y} + P_{\Psi_z\Psi_z})\int_{\Delta t} a_x\, dt\right)^2,$$

$$\sigma_{v_y}^2 = \left(w(P_{\Psi_x\Psi_x} + P_{\Psi_z\Psi_z})\int_{\Delta t} a_y\, dt\right)^2, \text{ and}$$

$$\sigma_{v_z}^2 = \left(w(P_{\Psi_x\Psi_x} + P_{\Psi_y\Psi_y})\int_{\Delta t} a_z\, dt\right)^2.$$

In certain embodiments w is a scaling factor of the equations that is calculated empirically or alternatively, w can be calculated algorithmically. Further, processing unit 108 uses the calculated variance increments for velocity to determine the process noise covariance matrix $Q_k$ increments for position. The increments to the process noise covariance matrix $Q_k$ for position are calculated according to the following equations:

$$\sigma_{p_x}^2 = \frac{\sigma_{v_x}^2 \Delta t^2}{4},\ \sigma_{p_y}^2 = \frac{\sigma_{v_y}^2 \Delta t^2}{4},\ \text{and}\ \sigma_{p_z}^2 = \frac{\sigma_{v_z}^2 \Delta t^2}{4}.$$

In certain embodiments, when processing unit 108 calculates the position and velocity variance increments for the process noise covariance matrix $Q_k$, non-linear compensation instructions 116 direct processing unit 108 to add the variance increments for position and velocity to corresponding components in the process noise covariance matrix $Q_k$. The addition of the position and velocity variance increments compensates for the unmodeled nonlinearities. In at least one implementation, processing unit 108 calculates new position and velocity variance increments for each new predicted navigation solution.

Further, when the vehicle 200 experiences large accelerations 202, the non-linear compensation instructions 116 direct processing unit 108 to also compensate for nonlinearities that arise in the attitude. To calculate the variance increment for attitude, the processing unit 108 uses the magnitude of the attitude reset and the associated integral for the local vertical specific force. For example, the magnitude of the attitude reset can be calculated from the attitude error $\Psi$ as follows:

$$|\text{attitude\_reset}| = \sqrt{\Psi_x^2 + \Psi_y^2 + \Psi_z^2}.$$

If the magnitude of the attitude reset is greater than a threshold value, non-linear compensation instructions 116 direct processing unit 108 to calculate an attitude variance increment to be added to the attitude component in the process noise covariance matrix. For example, in certain implementations, if the magnitude is greater than 0.05 radians, the processing unit 108 calculates the attitude variance increment for the process noise covariance matrix. To calculate the attitude variance increment, processing unit 108 determines the magnitude of the local vertical specific force according to the following equation $|LV| = \sqrt{LV\_X^2 + LV\_Y^2 + LV\_Z^2}$, where LV is the local vertical specific force and LV_X, LV_Y, and LV_Z represents the local vertical specific force along the three axes in the local vertical frame. Processing unit 108 uses the magnitude of the local vertical specific force and the magnitude of the attitude reset to calculate a standard deviation for the attitude as follows:

$$\sigma_\Psi = 0.2 * |LV| * |\text{attitude\_reset}|^2.$$

If the standard deviation for the attitude is less than a sentinel value, then non-linear compensation instructions 116 direct processing unit 108 to set the attitude variance increment for the attitude component in the process noise covariance matrix equal to $\sigma_\Psi^2$. However, if the standard deviation for the attitude is greater than the sentinel value, then non-linear compensation instructions 116 direct processing unit 108 to set the attitude variance increment for the attitude component in the process noise covariance matrix equal to the square of the sentinel value. In certain implementations, the sentinel value is 0.175 radians. In contrast to the variance increments for position and velocity, which, in certain embodiments, are updated on every cycle of Kalman filter instructions 114, the attitude component in the process noise covariance matrix is incremented only when the magnitude of the attitude reset is greater than the threshold value. By incrementing the position, velocity, and attitude components in the process noise covariance matrix as described above, the non-linear compensation instructions 116 direct processing unit 108 to compensate for unmodeled nonlinearities that arise when the vehicle experiences large accelerations when there is an error in the attitude. Further, the compensation for nonlinearities that arise due to large accelerations 202 also compensate for nonlinearities that arise due to high frequency motion 204.

The equation for the velocity derivative error d(Yv)/dt, described above to explain the nonlinearities associated with large accelerations 202, can be expanded out to include further terms as shown by the following equation:

$$\frac{d(\delta v)}{dt} = -\Psi \times A_L + C_b^L * \delta a_b + \ldots .$$

When ballistic flight 206 causes errors in the navigation solution 118 to develop due to unmodeled nonlinearities, the specific force output by accelerometers in IMU 102 approaches zero. When the specific force is sufficiently small, the first term (which overwhelms the second term during large accelerations 202) becomes overwhelmed by the second term such that the equation can be written as:

$$\frac{d(\delta v)}{dt} = C_b^L * \delta a_b + \ldots ,$$

where $\delta a_b$ is the acceleration error in the body axes.

As described above in relation to unmodeled nonlinearities that arise during large accelerations 202, the transformation matrix $C_b^L$ is a function of attitude error. Due to the dependence of $C_b^L$ on attitude error a second significant nonlinearity arises which is a function of the attitude error and the body acceleration error, as shown by the following equations.

Using the definition of the velocity derivative error without the term associated with the specific force and incorporating the definition for $C_b^L(\text{nav})$, where $C_b^L(\text{nav}) = C_b^L(\text{true}) + \delta C_b^L$, into $C_b^L$, the velocity derivative error equation becomes:

$$\frac{d(\delta v)}{dt} = [C_b^L(\text{true}) + \delta C_b^L] * \delta a_b,$$

which expands into $$\frac{d(\delta v)}{dt} = C_b^L(\text{true}) * \delta a_b + \delta C_b^L * \delta a_b.$$

The definition for $\delta C_b^L$ can also be further incorporated into the equation using the definition described above in relation to large accelerations 202, where $\delta C_b^L = \{-\Psi\} * C_b^L(\text{true})$. The incorporation of the definition of $\delta C_b^L$ into the equation yields:

$$\frac{d(\delta v)}{dt} = C_b^L(\text{true}) * \delta a_b + \{-\Psi\} * C_b^L(\text{true}) * \delta a_b.$$

From this equation, it can be seen that the velocity derivative error is both a function of attitude error and acceleration error in the body axes, and thus the equation is nonlinear and cannot be directly modeled with the linear Kalman filter.

Non-linear compensation instructions 116 direct processing unit 108 to compensate for unmodeled nonlinearities that arise during ballistic flight 206. To compensate for the ballistic flight nonlinearities, processing unit 108 calculates variance increments for the velocity components of the process noise covariance matrix that are equal to $[\{-\Psi\} * C_b^L(\text{true}) * \delta a_b] * k * \Delta t$, where $\Delta t$ is equal to the time of a Kalman filter cycle and k is a proportionality constant that is calculated as follows:

$$k = \sqrt{\frac{\text{Expcted\_Anomaly\_Duration}}{\Delta t}}.$$

The calculation of the variance increments for the process noise covariance matrix $Q_k$ can also be written according to the following equations:

$$\sigma_{v_x}^2 = k^2 \Delta t^2 ((C_{21}^2 P_{\Psi_z \Psi_z} + C_{31}^2 P_{\Psi_y \Psi_y}) P_{a_x a_x} + (C_{22}^2 P_{\Psi_z \Psi_z} + C_{32}^2 P_{\Psi_y \Psi_y}) P_{a_y a_y} + (C_{23}^2 P_{\Psi_z \Psi_z} + C_{33}^2 P_{\Psi_y \Psi_y}) P_{a_z a_z}),$$

$$\sigma_{v_y}^2 = k^2 \Delta t^2 ((C_{11}^2 P_{\psi_z \psi_z} + C_{31}^2 P_{\psi_x \psi_x}) P_{a_x a_x} +$$
$$(C_{12}^2 P_{\psi_z \psi_z} + C_{32}^2 P_{\psi_x \psi_x}) P_{a_y a_y} + (C_{13}^2 P_{\psi_z \psi_z} +$$
$$C_{33}^2 P_{\psi_x \psi_x}) P_{a_z a_z}),$$

$$\sigma_{v_x}^2 = k^2 \Delta t^2 ((C_{11}^2 P_{\psi_y \psi_y} + C_{21}^2 P_{\psi_x \psi_x}) P_{a_x a_x} +$$
$$(C_{12}^2 P_{\psi_y \psi_y} + C_{22}^2 P_{\psi_x \psi_x}) P_{a_y a_y} + (C_{13}^2 P_{\psi_y \psi_y} +$$
$$C_{23}^2 P_{\psi_x \psi_x}) P_{a_z a_z}).$$

When the variance increments are calculated, they are added to the process noise covariance matrix $Q_k$ to compensate for the unmodeled nonlinearities. Similar to the incrementing of process noise components associated with the position and velocity increments under large acceleration, the incrementing of process noise associated with ballistic flight is performed during every Kalman filter cycles.

Figure 3:
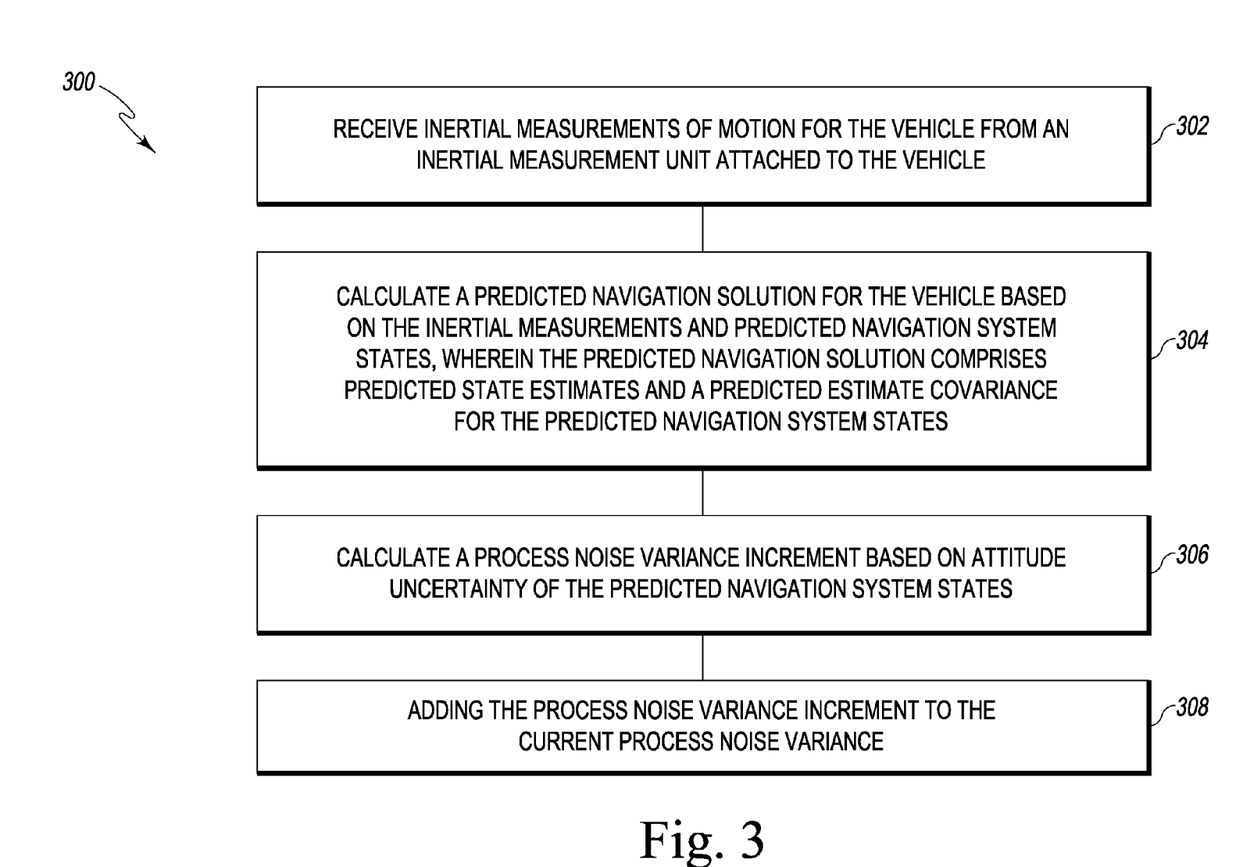
FIG. 3 is a flow diagram of a method for compensating nonlinearities in a navigational model according to one embodiment.

FIG. 3 is a flow diagram of a method 300 for compensating nonlinearities in a navigational model. The method 300 begins at 302, where inertial measurements of motion for a vehicle are received from an inertial measurement unit attached to the vehicle. For example, an inertial measurement unit containing three gyroscopes and three accelerometers senses the motion of the vehicle and provides the inertial measurements to a navigational computer. Further, aiding data is also received from other aiding sources. For example, an aiding source can be a GPS receiver or an assumption such as zero velocity and/or static heading. Method 300 proceeds to 304, where a predicted navigation solution for the vehicle based on the inertial measurements and predicted navigation system states is calculated. Also, state error estimates are calculated. The state error estimates are based on the blending of the inertial measurements with the aiding data. States are comprised of process noise, state error estimate and state estimation uncertainty. For example, the navigational computer implements a Kalman filter that calculates state error estimates from data from the inertial navigation solution blended with data from other aiding sources. The state error estimates are then used to update the predicated state.

Method 300 proceeds to 306, where a process noise variance increment based on attitude uncertainty of the predicted navigation system states is calculated. For example, the navigation computer uses the attitude uncertainty in the predicted state to calculate variance increments for the process noise associated with the velocity, position, and attitude of the process noise covariance matrix. Method 300 proceeds to 308, where the process noise variance increment is added to the current state process noise. For example, the navigation computer adds the variance increments to their corresponding values in the process noise covariance matrix, when the navigation computer calculates the predicted estimate covariance. By adding the variance increments to the process noise of the predicted estimate covariance, a linear navigation model is able to compensate for unmodeled nonlinearities that arise due to the motion of the vehicle.

As mentioned above, the methods and acts described herein can correspond to instructions on processor-readable media. The processor-readable media can be implemented as any available media that can be accessed by a general purpose or special purpose computer or processor, or any programmable logic device as discussed above with respect to storage medium 110 in FIG. 1.

Example Embodiments

Example 1 includes a navigation system comprising an inertial measurement unit configured to measure inertial motion of a vehicle; an aiding source configured to provide observational measurements of motion for the vehicle; and a navigation computer coupled to the inertial measurement unit and the aiding source, wherein the navigation computer is configured to calculate a predicted state and an error covariance data based on the measured inertial motion received from the inertial measurement unit and the observational measurements from the aiding source; calculate variance increments based on attitude uncertainty in the predicted state; add the variance increments into a process noise covariance matrix for the predicted state; and calculate an update for the motion of the vehicle based on the predicted state, the error covariance data, and the observational measurements.

Example 2 includes the system of Example 1, wherein the navigation computer compensates for nonlinear errors when the vehicle is experiencing ballistic flight.

Example 3 includes the system of any of Examples 1-2, wherein the navigation computer compensates for nonlinear errors when the vehicle experiences high frequency motion.

Example 4 includes the system of any of Examples 1-3, wherein the navigation computer compensates for nonlinear errors when the vehicle accelerates.

Example 5 includes the system of any of Examples 1-4, wherein the navigation computer calculates variance increments for the velocity components of the process noise covariance matrix.

Example 6 includes the system of any of Examples 1-5, wherein the navigation computer calculates variance increments for the position components of the process noise covariance matrix.

Example 7 includes the system of any of Examples 1-6, wherein the navigation computer calculates variance increments for the attitude components of the process noise covariance matrix.

Example 8 includes the system of Example 7, wherein the navigation computer adds the variance increment for the attitude components of the process noise covariance matrix when the standard deviation of the attitude uncertainty is greater than a sentinel value.

Example 9 includes the system of any of Examples 1-8, wherein the navigation computer adds the variance increments to the process noise covariance matrix when the navigation computer calculates a predicted state.

Example 10 includes the system of any of Examples 1-9, wherein the navigation computer adds the variance increments to the process noise covariance matrix when the magnitude of the attitude uncertainty exceeds a threshold value.

Example 11 includes a method for adjusting a linear model for estimating a navigation solution for a vehicle, the method comprising receiving inertial measurements of motion for the vehicle from an inertial measurement unit attached to the vehicle; calculating a predicted navigation solution for the vehicle based on the inertial measurements and predicted navigation system states, wherein the predicted navigation solution comprises predicted state estimates and a predicted estimate covariance for the predicted navigation system states; calculating a process noise variance increment based on attitude uncertainty of the predicted navigation system states; and adding the process noise variance increment to the current process noise variance.

Example 12 includes the method of Example 11, further comprising receiving observational measurements of the motion for the vehicle from an aiding source; and calculating an updated state based on the observational measurements and the predicted navigation system states.

Example 13 includes the method of any of Examples 11-12, wherein adding the variance increment comprises incrementing the predicted estimate covariance based on nonlinear motion that arises when the predicted navigation system states have attitude errors and experiences motion characterized by at least one of ballistic flight; acceleration; and high frequency motion.

Example 14 includes the method of any of Examples 11-13, wherein the variance increment describes the variance of the predicted navigation system states for the vehicle motion in at least one of velocity, position, and attitude.

Example 15 includes the method of any of Examples 11-14, wherein adding the variance increment comprises adding the process noise associated with the attitude of the vehicle when the magnitude of the attitude uncertainty is greater than a threshold value.

Example 16 includes the method of any of Examples 11-15, further comprising calculating a new set of variance increments when new predicted navigation system states are calculated.

Example 17 includes the method of any of Examples 11-16, further comprising multiplying the variance increment by a scaling factor.

Example 18 includes the method of Example 17, wherein the scaling factor is determined algorithmically.

Example 19 includes a program product for adjusting a linear model for estimating a navigation solution for a vehicle, the program product comprising a plurality of instructions tangibly stored on a storage medium, the instructions operable, when executed, to cause a processing unit to receive inertial measurements of motion of the vehicle from an inertial measurement unit attached to the vehicle; receive observational measurements of the motion of the vehicle from at least one aiding source associated with the vehicle; calculate a predicted navigation solution for the vehicle based on the inertial measurements and predicted navigation system states, wherein the predicted navigation solution comprises predicted state estimates and a predicted estimate covariance for the predicted navigation system states; calculating a variance increment based on attitude uncertainty of the predicted navigation system states; adding the variance increment to the current variance; and calculate an updated state based on the predicted navigation system states and the observational measurements.

Example 20 includes the system of Example 19, wherein the plurality of instructions are further operable to cause the processing unit to increment the process noise based on nonlinear motion that arises when the predicted navigation system states have attitude errors and experiences motion characterized by at least one of ballistic flight; acceleration; and high frequency motion.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A navigation system comprising:
    an inertial measurement unit configured to measure inertial motion of a vehicle;
    an aiding source configured to provide observational measurements of motion for the vehicle; and
    a navigation computer coupled to the inertial measurement unit and the aiding source, wherein the navigation computer is configured to
        calculate a predicted state and an error covariance data based on the measured inertial motion received from the inertial measurement unit and the observational measurements from the aiding source;
        calculate variance increments based on attitude uncertainty in the predicted state;
        add the variance increments into a process noise covariance matrix for the predicted state; and
        calculate an update for the motion of the vehicle based on the predicted state, the error covariance data, and the observational measurements.

2. The system of claim 1, wherein the navigation computer compensates for nonlinear errors when the vehicle is experiencing ballistic flight.

3. The system of claim 1, wherein the navigation computer compensates for nonlinear errors when the vehicle experiences high frequency motion.

4. The system of claim 1, wherein the navigation computer compensates for nonlinear errors when the vehicle accelerates.

5. The system of claim 1, wherein the navigation computer calculates variance increments for the velocity components of the process noise covariance matrix.

6. The system of claim 1, wherein the navigation computer calculates variance increments for the position components of the process noise covariance matrix.

7. The system of claim 1, wherein the navigation computer calculates variance increments for the attitude components of the process noise covariance matrix.

8. The system of claim 7, wherein the navigation computer adds the variance increment for the attitude components of the process noise covariance matrix when the standard deviation of the attitude uncertainty is greater than a sentinel value.

9. The system of claim 1, wherein the navigation computer adds the variance increments to the process noise covariance matrix when the navigation computer calculates a predicted state.

10. The system of claim 1, wherein the navigation computer adds the variance increments to the process noise covariance matrix when the magnitude of the attitude uncertainty exceeds a threshold value.

11. A method for adjusting a linear model for estimating a navigation solution for a vehicle, the method comprising:
    receiving inertial measurements of motion for the vehicle from an inertial measurement unit attached to the vehicle;
    calculating a predicted navigation solution on a processing unit, wherein the predicted navigation solution is for the vehicle based on the inertial measurements and predicted navigation system states, wherein the predicted navigation solution comprises predicted state estimates and a predicted estimate covariance for the predicted navigation system states;
    calculating a process noise variance increment based on attitude uncertainty of the predicted navigation system states; and
    adding the process noise variance increment to the current process noise variance.

12. The method of claim 11, further comprising:
    receiving observational measurements of the motion for the vehicle from an aiding source; and
    calculating an updated state based on the observational measurements and the predicted navigation system states.

13. The method of claim 11, wherein adding the variance increment comprises incrementing the predicted estimate covariance based on nonlinear motion that arises when the predicted navigation system states have attitude errors and experiences motion characterized by at least one of ballistic flight; acceleration; and high frequency motion.

14. The method of claim 11, wherein the variance increment describes the variance of the predicted navigation system states for the vehicle motion in at least one of velocity, position, and attitude.

15. The method of claim 11, wherein adding the variance increment comprises adding the process noise associated with the attitude of the vehicle when the magnitude of the attitude uncertainty is greater than a threshold value.

16. The method of claim 11, further comprising calculating a new set of variance increments when new predicted navigation system states are calculated.

17. The method of claim 11, further comprising multiplying the variance increment by a scaling factor.

18. The method of claim 17, wherein the scaling factor is determined algorithmically.

19. A program product for adjusting a linear model for estimating a navigation solution for a vehicle, the program product comprising a plurality of instructions tangibly stored on a non-transitory storage medium, the instructions operable, when executed, to cause a processing unit to:
receive inertial measurements of motion of the vehicle from an inertial measurement unit attached to the vehicle;
receive observational measurements of the motion of the vehicle from at least one aiding source associated with the vehicle;
calculate a predicted navigation solution for the vehicle based on the inertial measurements and predicted navigation system states, wherein the predicted navigation solution comprises predicted state estimates and a predicted estimate covariance for the predicted navigation system states;
calculating a variance increment based on attitude uncertainty of the predicted navigation system states;
adding the variance increment to the current variance; and
calculate an updated state based on the predicted navigation system states and the observational measurements.

20. The system of claim 19, wherein the plurality of instructions are further operable to cause the processing unit to increment the process noise based on nonlinear motion that arises when the predicted navigation system state has attitude errors and experiences motion characterized by at least one of ballistic flight; acceleration; and high frequency motion.

* * * * *